(12) United States Patent
Reese et al.

(10) Patent No.: US 6,983,611 B2
(45) Date of Patent: Jan. 10, 2006

(54) STORAGE CONTAINER FOR CRYOGENIC MEDIA

(75) Inventors: Wilfried-Henning Reese, Unterschleissheim (DE); Joachim Wolf, Munich (DE)

(73) Assignee: Linde AG, Wiesbaden (DE)

( * ) Notice: Subject to any disclaimer, the term of this patent is extended or adjusted under 35 U.S.C. 154(b) by 23 days.

(21) Appl. No.: 10/399,991

(22) PCT Filed: Oct. 18, 2001

(86) PCT No.: PCT/EP01/12057

§ 371 (c)(1),
(2), (4) Date: Sep. 25, 2003

(87) PCT Pub. No.: WO02/35143

PCT Pub. Date: May 2, 2002

(65) Prior Publication Data

US 2004/0107706 A1 Jun. 10, 2004

(30) Foreign Application Priority Data

Oct. 24, 2000 (DE) ........................................ 100 52 856

(51) Int. Cl.
*F17C 11/00* (2006.01)

(52) U.S. Cl. ........................................ 62/45.1; 62/50.1
(58) Field of Classification Search ................. 62/45.1, 62/50.1, 50.4, 53.2; 141/89, 91
See application file for complete search history.

(56) References Cited

U.S. PATENT DOCUMENTS

| | | | | |
|---|---|---|---|---|
| 646,459 A | * | 4/1900 | Place | 220/560.1 |
| 707,634 A | * | 8/1902 | Place | 220/560.1 |
| 2,871,669 A | | 2/1959 | Douglas et al. | |
| 3,304,729 A | | 2/1967 | Rice et al. | |
| 3,698,200 A | | 10/1972 | Johnson et al. | |
| 5,005,362 A | | 4/1991 | Weltmer, Jr. et al. | |
| 5,365,981 A | * | 11/1994 | Peschka et al. | 141/7 |
| 5,613,366 A | * | 3/1997 | Schoenman | 62/45.1 |
| 5,960,633 A | * | 10/1999 | Limbach | 62/45.1 |
| 6,029,456 A | * | 2/2000 | Zaiser | 62/45.1 |
| 6,128,914 A | * | 10/2000 | Tamaoki et al. | 62/440 |
| 6,176,088 B1 | * | 1/2001 | Vidinsky | 62/51.1 |
| 6,230,516 B1 | * | 5/2001 | Andonian | 62/461 |
| 6,343,476 B1 | * | 2/2002 | Wang et al. | 62/46.1 |
| 6,360,546 B1 | * | 3/2002 | Wang et al. | 62/48.1 |
| 6,519,919 B1 | * | 2/2003 | Takenouchi et al. | 53/431 |
| 6,542,848 B1 | * | 4/2003 | Neeser et al. | 702/156 |
| 6,672,077 B1 | * | 1/2004 | Bradley et al. | 62/46.1 |
| 6,708,502 B1 | * | 3/2004 | Aceves et al. | 62/45.1 |

FOREIGN PATENT DOCUMENTS

| | | | |
|---|---|---|---|
| EP | 0744576 | | 11/1996 |
| JP | 630155100 A | * | 8/1985 |
| JP | 404018713 A | * | 1/1992 |
| JP | 10176796 | | 6/1998 |

OTHER PUBLICATIONS

Patent Abstracts of Japan, Sep. 30, 1998, vol. 1998, No. 11.

* cited by examiner

*Primary Examiner*—Mohammad M. Ali
(74) *Attorney, Agent, or Firm*—Millen, White, Zelano & Branigan, P.C.

(57) ABSTRACT

A storage container (1) for cryogenic media (2), especially for liquid hydrogen, having an outside container (3), an inside container (4) and at least one extraction and fill line (6, 6') is described. According to the invention in the storage container (1), there is at least one additional storage space (5, 5') for a medium and at least the extraction line (6, 6') is dynamically connected to the additional storage space (5, 5'). A shield (12) that preferably at least partially surrounds the inside container (4) can be assigned to the additional storage space (5, 5') and can be in thermal contact with it. The additional storage space (5) can also be made in the form of a hollow chamber section and can at least partially surround the inside container (4). The invention makes it possible to greatly reduce the evaporation rate in storage containers (1) that are used to store cryogenic media (2).

26 Claims, 2 Drawing Sheets

STORAGE CONTAINER FOR CRYOGENIC MEDIA

Figure 1:
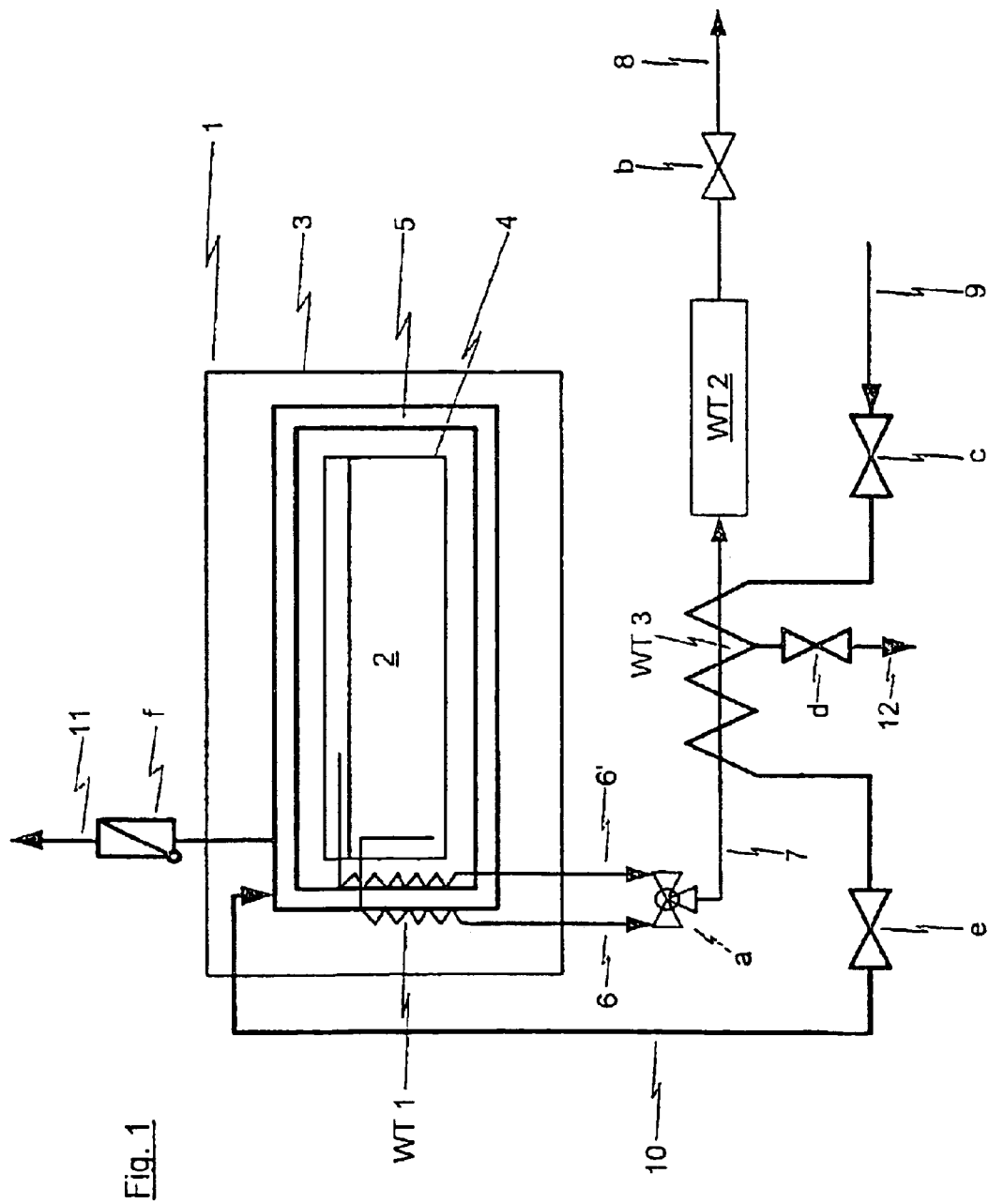

The invention relates to a storage container for cryogenic media, especially for liquid hydrogen, having an outside container, an inside container and at least one extraction and fill line.

Below, in the labelling of special cryogenic media according to their aggregate state, the letter "G" for gaseous and "L" for liquid are prefixed, thus, e.g., $GH_2$ and $LH_2$ for gaseous and liquid hydrogen.

In particular, hydrogen is gaining importance at present as a fuel due to increasing energy demand and increased environmental consciousness. Thus, trucks, busses and passenger cars are already being powered by means of hydrogen-fueled engines or fuel cells. Moreover, initial experiments are underway to power aircraft with the above-mentioned media.

The storage of hydrogen "on board" the above-mentioned modes of transportation in liquid form is most efficient in this case. The hydrogen must be cooled for this purpose to roughly 21 K and kept at this temperature—which can only be done by the corresponding insulating measures on the storage containers or tanks—but storage in the gaseous state due to the low density of $GH_2$ in the above-mentioned modes of transportation is generally less favorable, since storage here must be done in large-volume and heavy storage containers at high pressures.

Generic storage containers for cryogenic media, especially for liquid hydrogen, have been known for a long time. If no medium is removed from them over a longer time interval, within the inside container the temperature and pressure rise due to the incidence of heat from the environment into the medium, which cannot be prevented. Such storage containers therefore always have the capability that when a certain pressure is reached, some of the medium stored in them can be released from the inside container into the atmosphere. The amount that has escaped from the inside container in this way is, however, lost unused.

Known storage containers for liquid hydrogen enable parking times from 2 to 3 days before evaporation of gaseous hydrogen occurs. The acceptance of hydrogen as a fuel—especially in passenger cars—is dependent, i.a., on the possible length of time the passenger car is parked. Blowing-off of hydrogen after 2 to 3 days would certainly not be accepted by the customer.

The object of this invention is to devise a storage container for cryogenic media, especially for hydrogen, which enables a longer parking time, therefore reduces heat incidence onto the medium stored in it, which results in that the temperature and pressure rise within the inside container proceeds more slowly.

To achieve this object, a storage container is proposed that is characterized in that in the storage container, there is at least one additional storage space for a medium and at least the extraction line(s) of the storage container is(are) dynamically connected to the additional storage space.

Here, the dynamic connection between the extraction line or lines of the storage container and the additional storage space is made preferably in the form of a heat exchanger.

The additional storage space provided according to the invention within the storage container can be filled, for example, with a medium that stores energy via a phase transition, such as, for example, nitrogen, argon, etc. Such media are also called PCMs (Phase Change Material).

According to advantageous embodiments of the storage container according to the invention, a shield that preferably at least partially surrounds the inside container is assigned to the additional storage space, and the additional storage space is in thermal contact with this shield.

In addition or alternatively, the additional storage space can also be made in the form of a hollow chamber section and can surround the inside container of the storage container according to the invention at least in part.

The heat incidence into the storage container according to the invention that necessarily occurs now leads to the medium stored in the additional storage space or the shield connected to the additional storage space—that shield consists preferably of copper—being heated. This results in that the temperature and thus also the pressure in the inside container remain first essentially unchanged or rise to a much smaller degree than is the case in known storage containers. Thus, evaporation of the medium from the inside container of the storage container is slowed down, significantly lengthening the parking times.

Developing the storage container for cryogenic media according to the invention, it is proposed that at least one fill line be assigned to the additional storage space.

This configuration makes it possible to implement a so-called "open system" in which, for example, ambient air travels into the additional storage space via the fill line.

If at this point the inside container of the storage container according to the invention is filled with a cryogenic medium, the air in the additional storage space liquifies. In the case of a longer parking time, the air located in the additional storage space is then heated again as a result of heat incidence.

The air can be liquefied, however, not only when the storage container is being filled with the cryogenic medium, but also—as will be explained below—when the cryogenic medium is being removed from the storage tank. Liquefaction during removal additionally has the advantage that the heat energy of the removed cold medium is used.

Means for cleaning the medium routed into the additional storage space are assigned to the above-mentioned fill line.

Here, these cleaning means are in turn preferably made as at least one heat exchanger in which heat exchange takes place between the medium that has been supplied to the additional storage space and the cryogenic medium that has been withdrawn from the storage container.

If at this point, for example, air from the vicinity travels via the fill line into the additional storage space only when the above-mentioned heat exchange takes place with the cryogenic medium withdrawn from the storage container, this heat exchange acts as a cold trap for the moisture contained in the ambient air and the carbon dioxide contained in it. These components condense as early as during heat exchange and can thus be separated from the amount of air that is to be supplied to the additional storage space. Freezing-out of these components within the line system is thus efficiently prevented.

Figure 2:
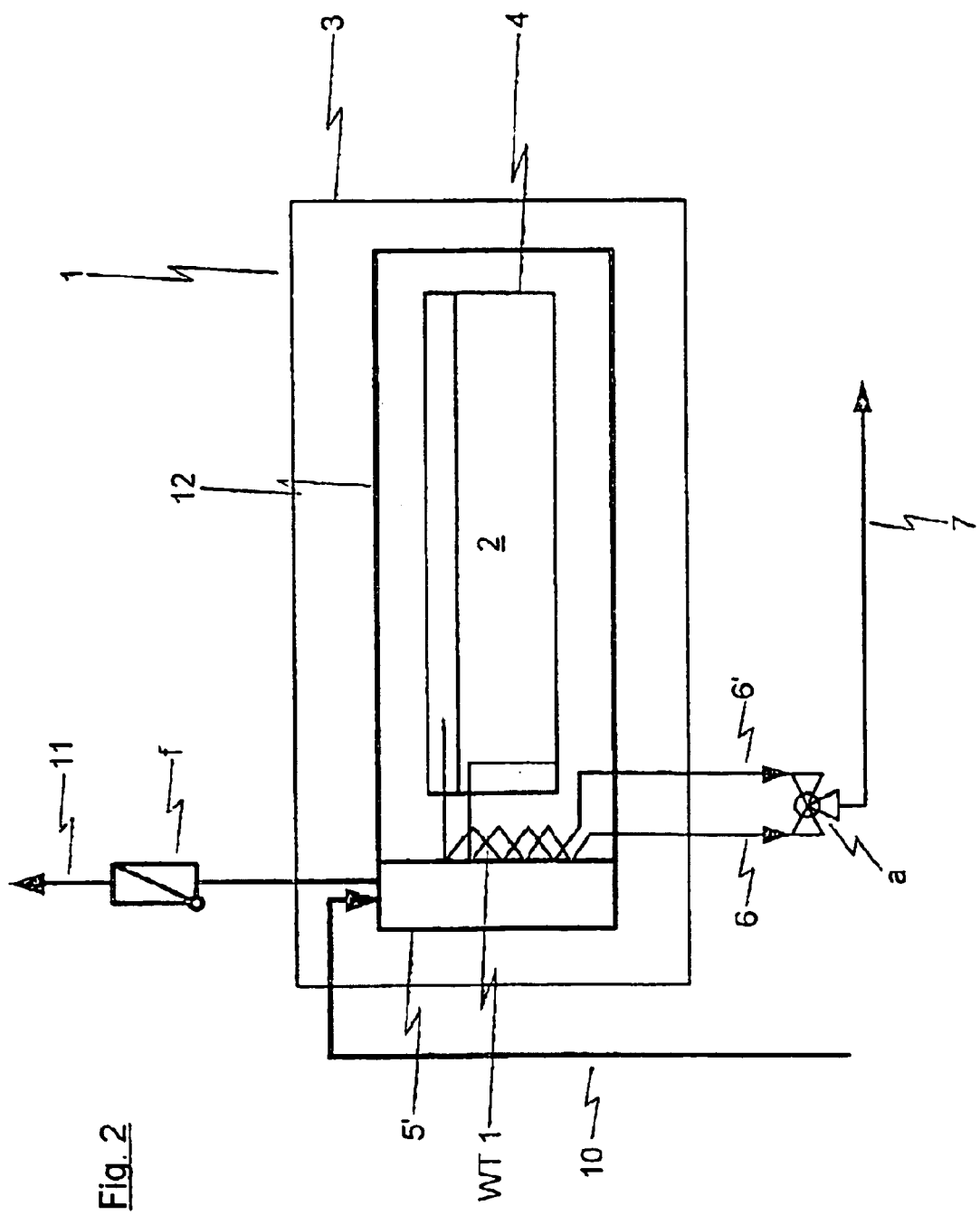

The storage container according to the invention and other configurations thereof are explained in more detail using the two embodiments shown in FIGS. 1 and 2.

FIG. 1 shows a first embodiment of the storage container 1 according to the invention that has an outside container 3 and an inside container 4. There is preferably superinsulation between them. The cryogenic medium 2 located in the inside container 4—in this case liquid hydrogen—can be removed both in liquid form—via the extraction line 6—and also in gaseous form—via the extraction line 6'—from the storage container 1 or its inside container 4.

The two extraction lines 6 and 6' are combined by means of a three-way valve a into a common line 7. The removed hydrogen is now routed through the two heat exchangers WT 3 and WT 2 and preheated in them. While the preheating of the hydrogen in the heat exchanger WT 3 will be detailed later, in the heat exchanger WT 2 further preheating of the hydrogen against a cooling medium, such as for example engine coolant, takes place.

The hydrogen is then supplied to a drive assembly and/or a fuel cell via the line 8, in which there is the control valve b.

According to the invention, within the storage container 1 there is now an additional storage space 5. In principle, however, there can also be two or more additional storage spaces. The additional storage space 5 surrounds the inside container 4 of the storage container 1 according to the invention essentially completely in the embodiment shown in FIG. 1. This can be accomplished, for example, in that the additional storage space 5 is made in the form of a hollow chamber section.

Ambient air is supplied to the above-mentioned WT 3 via the line 9 in which there is a valve c. The latter is cooled in the heat exchanger WT 3 against the hydrogen flow to be preheated in the line 7, whereby the unwanted components such as moisture and carbon dioxide are condensed out and can be withdrawn via the line 12, in which there is likewise a valve d. The dehumidified air flow from which carbon dioxide has been removed is then supplied via the line 10 in which there is a valve e to the additional storage space 5 that is located within the storage container 1.

For safety reasons, the additional storage space 5 has a drain line 11 in which an overpressure valve f is located that enables discharge via the drain line 11 when a preset pressure is reached.

The additional storage space 5 in the embodiment shown in FIG. 1 is dynamically connected to the two extraction lines 6 and 6' such that heat exchange can take place between the hydrogen removed via the extraction lines 6 and/or 6' and the liquified air located in the additional storage space 5—in FIG. 1 shown by the heat exchanger WT 1.

The liquified air located in the additional storage space 5 is now forcefully cooled via the heat exchanger WT 1 in the storage container 1 according to the invention each time hydrogen is removed—whether via the extraction line 6 or 6'.

By reducing the vapor pressure of the liquid air in the storage space 5, new air that has been precooled in the heat exchanger WT 3 is taken in and liquefied in the heat exchanger WT 1 or in the storage space 5 itself. In order to prevent water and carbon dioxide from entering the storage space 5 and in order to achieve precooling of the air, the air that is taken in is cooled in the heat exchanger WT 3 to a temperature which is above the liquefaction point of air. Water and carbon dioxide precipitate as ice on the cold surfaces of the heat exchanger WT 3. The regeneration of the heat exchanger WT 3 takes place during any longer parking time of the vehicle.

Valves e and c are closed when no hydrogen is being removed from the inside container 4. The heat exchanger WT 3 is heated at these times due to heat incidence from the environment or by a built-in heater that is not shown in FIGS. 1 and 2. Water and carbon dioxide again become liquid or gaseous and are released into the environment via the valve d. It must be watched that the valve e is only (re)opened when the heat exchanger WT 3 has reached a temperature that allows freezing-out of the water and carbon dioxide in order to prevent these substances from entering the additional storage space 5.

FIG. 2 shows a second embodiment of the storage container 1 according to the invention, however, the representation of all the components shown in FIG. 1 is abandoned.

While in the embodiment shown in FIG. 1 the additional storage space 5 essentially completely surrounds the inside container 4 of the storage container 1 according to the invention, at this point within the storage container 1 according to the invention there is an additional storage space 5', to which a shield 12 is assigned with which the additional storage space 5' is in thermal contact. The shield 12 surrounds the inside container 4 preferably essentially completely in this case.

By the appropriate selection of material or materials for the shield 12, this embodiment of the invention achieves equivalent shielding of the inside container 4 compared to the design according to the embodiment shown in FIG. 1.

What is claimed is:

1. A storage container (1) comprising an outside container (3), an inside container (4), at least one extraction and fill line (6, 6'), at least one additional storage space (5, 5') within said container for storing a medium, wherein said at least the extraction line (6, 6') is dynamically connected to said additional storage space (5, 5'), and at least one further fill line (9, 10) connected to said additional storage space, wherein said additional storage space can be connected to ambient air via said at least one further fill line, wherein the additional storage space is filled with air.

2. A storage container (1) according to claim 1, wherein said at least the extraction line (6, 6') and said additional storage space (5, 5') are dynamically connected by means of a heat exchanger (WT 1).

3. A storage container (1) according to claim 1, further comprising a shield (12) that at least partially surrounds said inside container (4) and which is assigned to said additional storage space (5, 5') and is in thermal contact with said additional storage space.

4. A storage container (1) according to claim 1, wherein said additional storage space (5) is a hollow chamber section which at least partially surrounds said inside container (4).

5. A storage container (1) according to claim 1, wherein said further fill line comprises means for cleaning which is to be medium routed into said additional storage space (5, 5').

6. A storage container (1) according to claim 5, wherein said means for cleaning medium which is to be routed into said additional storage space (5, 5') comprises at least one heat exchanger (WT 3), which provides heat exchange between the medium which is to be routed into said additional storage space (5, 5') and medium withdrawn from said storage container (1).

7. A storage container (1) according to claim 1, further comprising at least one drain line (11) assigned to said additional storage space (5, 5').

8. A storage container (1) according to claim 7, wherein said drain line (11), has an overpressure valve (f).

9. In a method of storing cryogenic media (2) in a storage container in a motor vehicle vehicle that is powered at least in part by cryogenic media, the improvement wherein said storage container is a container according to claim 1.

10. A storage container according to claim 1, wherein said inside container contains cryogenic media.

11. A storage container according to claim 1, wherein said inside container contains liquid hydrogen.

12. A storage container (1) according to claim 2, further comprising a shield (12) that at least partially surrounds said inside container (4) and which is assigned to said additional storage space (5, 5') and is in thermal contact with said additional storage space.

13. A storage container (1) according to claim 2, wherein said additional storage space (5) is a hollow chamber section which at least partially surrounds said inside container (4).

14. A storage container (1) according to claim 3, wherein said additional storage space (5) is a hollow chamber section which at least partially surrounds said inside container (4).

15. A storage container (1) according to claim 12, wherein said additional storage space (5) is a hollow chamber section which at least partially surrounds said inside container (4).

16. A storage container (1) comprising an outside container (3), an inside container (4), at least one extraction and fill line (6, 6'), at least one additional storage space (5, 5') within said container for storing a medium, wherein said at least the extraction line (6, 6') is dynamically connected to said additional storage space (5, 5'), and at least one further fill line (9, 10) connected to said additional storage space, wherein said further fill line comprises means for cleaning the medium which is to be routed into said additional storage space (5, 5').

17. A storage container (1) according to claim 16, wherein said means for cleaning medium which is to be routed into said additional storage space (5, 5') comprises at least one heat exchanger (WT 3), which provides heat exchange between medium which is to be routed into said additional storage space (5, 5') and medium withdrawn from said storage container (1).

18. A storage container (1) according to claim 3, wherein said shield (12) is made of copper.

19. A storage container (1) according to claim 1, wherein said storage container has insulation provided between said outside container (3) and said inside container (4).

20. A storage container (1) according to claim 1, wherein said at least one extraction and fill line (6, 6') includes a first extraction and fill line (6) for removing liquid cryogenic medium from said first container and a second extraction and fill line (6') for removing gaseous cryogenic medium from said first container, said first and second extraction and fill lines both being in heat exchange relationship with said additional storage space (5, 5').

21. A storage container (1) according to claim 20, wherein said first and second extraction and fill lines are connected to a three way valve which is further connected to a supply line, wherein said supply line is in heat exchange relationship with at least one further fill line.

22. A storage container (1) comprising: an outside container (3), an inside container (4), at least one extraction and fill line (6, 6') in fluid communication with said inside container, at least one hollow chamber defining an additional storage space (5, 5') within said container wherein said at least the extraction line (6, 6') is in heat exchange relationship with said additional storage space (5, 5'), and at least one further fill line (9, 10) in fluid communication with said additional storage space, wherein said additional storage space is connected to a source of air via said at least one further fill line, wherein the additional storage space is filled with air.

23. A storage container (1) according to claim 22, wherein said at least one extraction and fill line (6, 6') includes a first extraction and fill line (6) for removing liquid cryogenic medium from said first container and a second extraction and fill line (6') for removing gaseous cryogenic medium from said first container, said first and second extraction and fill lines both being in heat exchange relationship with said additional storage space (5, 5').

24. A storage container (1) according to claim 23, wherein said first and second extraction and fill lines are connected to a three way valve which is further connected to a supply line (8), wherein said supply line is in heat exchange relationship with at least one further fill line.

25. A storage container (1) according to claim 24, further comprising at least one drain line (11) assigned to said additional storage space (5, 5').

26. A storage container (1) according to claim 25, wherein said drain line (11) has an overpressure valve (f).

* * * * *